United States Patent Office 3,364,000
Patented Jan. 16, 1968

3,364,000
PETROLEUM DISTILLATE FUELS CONTAINING ESTER-AMIDE-ACID COMPOUNDS
Verner L. Stromberg, Webster Groves, Mo., assignor to Petrolite Corporation, Wilmington, Del., a corporation of Delaware
No Drawing. Continuation-in-part of application Ser. No. 86,591, Feb. 2, 1961. This application Nov. 12, 1964, Ser. No. 410,746
10 Claims. (Cl. 44—69)

This application is a continuation-in-part of Serial No. 86,591, now Patent No. 3,172,853.

This invention relates to the reaction product of two moles of an alkenyl succinic acid or an anhydride thereof (also referred to as "ASAA") and one mole of an amino alkanol or substituted amino-alkanol having at least three carbon atoms; and to the process of preparing this product. More particularly, this invention relates to a composition of matter prepared from the above reactants having one ester group, one amide group and two carboxylic acid groups per molecule (also referred to as an "ester-amide-acid"). Still more particularly, this invention relates to a compound having the formula:

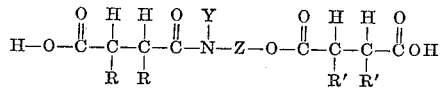

wherein Z is an alkylene or substituted alkylene radical having at least three carbon atoms, for example from 3 to 12 or more carbon atoms, but preferably 3 to 8 carbon atoms; wherein one of the R's or R''s on each succinic moiety is an alkenyl radical having at least 2 carbons, for example 2 to 32 or more carbons, but preferably 8 to 18 carbons and the other R or R' on each succinic moiety is hydrogen; and wherein Y is hydrogen or a hydrocarbon group, for example an aliphatic group preferably lower alkyl.

This invention also relates to the use of these compositions in various arts, particularly as corrosion inhibitors, such as for oil wells, oil refineries, in slushing oils, refined mineral oil such as gasoline, jet fuel, etc., as leaded gasoline anti-fouling additives, etc.

The aminoalkanols employed in preparing the product of this invention contain alkylene or substituted alkylene radicals having at least three carbon atoms and both an amino and an hydroxyl radical. These can be expressed by the formula:

$$\begin{array}{c} H \\ | \\ Y-N-Z-OH \end{array}$$

wherein Z is an alkylene or substituted alkylene radical having at least three carbon atoms, for example 3 to 12 or more, but preferably 3 to 8 carbons; and Y is hydrogen or a hydrocarbon group, for example an aliphatic group, preferably lower alkyl.

Thus, Z is an alkylene radical which can be straight-chained or branched chain, for example propylene, butylene, pentylene, hexylene, heptylene, octylene, nonylene, decylene, etc., and isomers thereof, for example—isopropylene, isobutylene, isopentylene, isohexylene, isoheptylene, isooctylene, isononylene, isodecylene, etc. The alkylene radical can be straight chained singly branched, for example

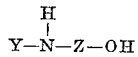

or multi-branched —CH₂—CH—CH—CH₂—
                                |    |
                               CH₃  CH₃
                                    |
                                   CH₃

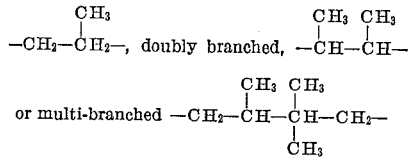

etc. In addition, the alkylene groups can be substituted with other groups, for example aromatic groups, for example phenyl, tolyl, etc. In such instances the alkylene radical need not have three carbon atoms but may have only two, for example it may be ethylene wherein the ethylene radical also contains an aromatic group such as a phenyl group, etc. The amino or alcohol group can be attached to the carbon atoms of the alkylene radical which are primary, secondary, or tertiary carbons. The carbons to which these radicals are attached need not be of the same type. For example, in isopropyl amine, $$\begin{array}{c} CH_3 \\ | \\ NH_2-CH_2-C-OH \\ | \\ H \end{array}$$

the preferred aminoalkanol, the alcohol radical is attached to a secondary carbon atom while the amino group is attached to a primary carbon atom. Examples illustrating various positions of attachment of the functional groups are:

5-amino-4-octanol,
1-amino-2-hexanol,
2-amino-3-hexanol,
2-amino-2-methyl-3-hexanol,
3-amino-4-hexanol,
2-amino-1-hexanol, 3-amino-2-hexanol,
1-amino-2-heptanol, 2-amino-3-heptanol,
3-amino-4-heptanol, 1-amino-2-octanol,
2-amino-3-octanol, 2-amino-2-methyl,
3-octanol, 3-amino-4-octanol,
2-amino-1-octanol, 3-amino-2-octanol, etc.

Although the above aminoalkanols are illustrated with aminoalkanol containing primary amino groups, it should be understood that corresponding compounds containing amidifiable secondary amino groups can also be employed.

Thus, aminoalkanols corresponding to those mentioned herein except that they contain N-aliphatic groups, such as N-alkyl groups, for example methyl, ethyl, propyl, butyl, pentyl, hexyl, octyl, octadecyl, cycloaliphatic, etc., isomeric alkyl groups, etc., can be employed in this invention. In addition, N-alkenyl or N-alkinyl groups can also be employed.

One convenient method of preparing these aminoalkanols is to react ammonia or a primary amine with an alkylene oxide on another hydrocarbon oxide having at least 3 carbon atoms, for example propylene oxide, butylene oxide, octylene oxide, styrene oxide, etc. Other methods of preparing these aminoalkanols are so well known to the art that it is unnecessary to repeat them here.

Any alkenyl succinic acid anhydride or the corresponding acid is utilizable for the production of the reaction products of the present invention. The general structural formulae of these compounds are:

Anhydride
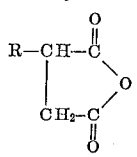

Acid
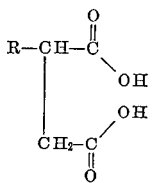

wherein R is an alkenyl radical. The alkenyl radical can be straight-chain or branched-chain; and it can be saturated at the point of unsaturation by the addition of a substance which adds to olefinic double bonds, such as hydrogen, sulfur, bromine, chlorine, or iodine. It is obvious, of course, that there must be at least two carbon atoms in the alkenyl radical, but there is no real upper limit to the number of carbon atoms therein. However, it is preferred to use an alkenyl succinic acid anhydride reactant having between about 8 and about 18 carbon atoms per alkenyl radical. In order to produce the reaction products of this invention, however, an alkenyl succinic acid anhydride or the corresponding acid must be used. Succinic acid anhydride and succinic acid are not utilizable herein. For example, the reaction product produced by reacting with succinic acid anhydride is unsatisfactory. Although their use is less desirable, the alkenyl succinic acids also react, in accordance with this invention, to produce satisfactory reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purposes of the present invention. Accordingly, when the term "alkenyl succinic acid anhydride," is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are ethenyl succinic acid anhydrides; ethenyl succinic acid; ethyl succinic acid anhydride; propenyl succinic acid anhydride; sulfurized propenyl succinic acid anhydride; butenyl succinic acid; 2-methyl-butenyl succinic acid anhydride; 1,2-dichloropentyl succinic acid anhydride; hexenyl succinic acid anhydride; hexyl succinic acid; sulfurized 3-methylpentenyl succinic acid anhydride; 2,3-dimethylbutenyl succinic acid anhydride; 3,3-dimethylbutenyl succinic acid; 1,2-dibromo-2-ethylbutyl succinic acid; heptenyl succinic acid anhydride; 1,2-diiodooctyl succinic acid; octenyl succinic acid anhydride; 2-methylheptenyl succinic acid anhydride; 4-ethylhexenyl succinic acid; 2-isopropylpentenyl succinic acid anhydride; nonenyl succinic acid anhydride; 2-propylhexenyl succinic acid anhydride; decenyl succinic acid; decenyl succinic acid anhydride; 5-methyl-2-isopropylhexenyl succinic acid anhydride; 1,2-dibromo-2-ethyloctenyl succinic acid anhydride; decyl succinic acid anhydride; undecenyl succinic acid anhydride; 1,2-dichloroundecyl succinic acid; 3-ethyl-2-t-butylpentenyl succinic acid anhydride; dodecenyl succinic acid anhydride; dodecenyl succinic acid; 2-propylnonenyl succinic acid anhydride; 3-butyloctenyl succinic acid anhydride; tridecenyl succinic acid anhydride; tetradecenyl succinic acid anhydride; hexadecenyl succinic acid anhydride; sulfurized octadecenyl succinic acid; octadecyl succinic acid anhydride; 1,2-dibromo-2-methylpentadecenyl succinic acid anhydride; 8-propylpentadecyl succinic acid anhydride; eicosenyl succinic acid anhydride; 1,2-dichloro-2-methylnonadecenyl succinic acid anhydride; 2-octyldodecenyl succinic acid; 1,2-diiodotetracosenyl succinic acid anhydride; hexacosenyl succinic acid; hexacosenyl succinic acid anhydride; and hentriacontenyl succinic acid anhydride.

The methods of preparing the alkenyl succinic acid anhydrides are well known to those familiar with the art. The most feasible method is by the reaction of an olefin with maleic acid anhydride. Since relatively pure olefins are difficult to obtain, and when thus obtainable, are often too expensive for commercial use, alkenyl succinic acid anhydrides are usually prepared as mixtures by reacting mixtures of olefins with maleic acid anhydride. Such mixtures, as well as relatively pure anhydrides, are utilizable herein.

In general, the alkenyl succinic acid anhydride is reacted with the aminoalkanol in a proportion of 2 moles of alkenyl succinic acid anhydride for each mole of aminoalkanol. Of course, more than 2 moles of alkenyl succinic acid per mole of aminoalkanol can be employed, leaving an excess of alkenyl succinic anhydride in the reaction mixture.

For example, when two moles of an alkenyl succinic acid are reacted with one mole of an aminoalkanol or two moles of an alkenyl succinic acid anhydride are reacted with one mole of an aminoalkanol, a reaction product is produced, representing the complete chemical interaction of the reactants. However, when three moles of an alkenyl succinic acid anhydride reactant are reacted with the aminoalkanol, a product is produced which comprises a physical mixture of the reaction product plus the unreacted alkenyl succinic anhydride.

The reaction between the alkenyl succinic acid anhydride and the aminoalkanol takes place at any temperature ranging from ambient temperatures and upwards. This reaction results in an amide-ester formation reaction effected by the well known reaction of the anhydride group with an amino and an alcohol group. This reaction proceeds at any temperature, but temperatures of about 100° C. are preferred. Thus, the reaction can take place at 20 to 200° C., but preferably 100 to 150° C.

The reaction between the alkenyl succinic acid anhydride reactant and the aminoalkanol proceeds smoothly in the absence of solvents. However, the occurrence of undesirable side reactions is minimized when a solvent is employed and therefore its use of a solvent is preferable. Since a small amount of water might be formed when an alkenyl succinic acid anhydride is used in the reaction, the solvent employed may be one which will form an azeotropic mixture with water.

The time of reaction is dependent on the size of the charge, the reaction temperature selected, and the means employed for removing any water from the reaction mixture. Ordinarily, the addition of the anhydride reactant is substantially complete within a few minutes. The same products can be produced at temperatures below 100° C. for a reaction time of less than one hour. In order to insure complete reaction, particularly when the alkenyl succinic acid is employed, one may continue heating for several hours. For example when benzene is used as the solvent at a temperature of 100–110° C., and water is removed, as occurs with alkenyl succinic acid, heating may be continued for about five hours. When water is formed during the reaction, as when an alkenyl succinic acid is used, the completion of the reaction is indicated by a substantial decrease in the formation of water. In general, the reaction time will vary between several minutes and about ten hours.

Certain reaction products of this invention will be very viscous, or even solid, rendering handling very difficult from a commercial standpoint. These difficulties can often be alleviated by producing the reaction products in a solution or dispersion. The solvent can be added to the reaction mixture of the aminoalkanol and alkenyl succinic acid anhydride reactant, before they are reacted with each other. In an alternate procedure, the reaction product can be produced by the methods mentioned hereinbefore, and then the solvent can be added to the reaction product while it is still hot. Dependent on the type of reaction product involved and of final product desired, the solvent can be used in any amount, thereby producing reaction products containing from about one percent by weight of solvent up to as much as 99 percent by weight of solvent.

The reaction which takes place can be expressed by the following equation, wherein the units have the meaning heretofore specified:

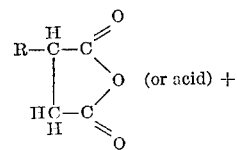

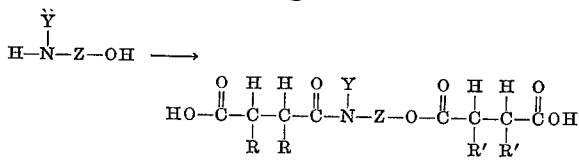

The reason why the position of the R groups on the succinic moiety are not specifically designated is that two possible reactions can take place—one, where the R and R' groups are adjacent to the amido or ester group, and the other, where the R or R' groups are adjacent to the free carboxylic acid group. Although it is believed that the chief reaction product is as follows:

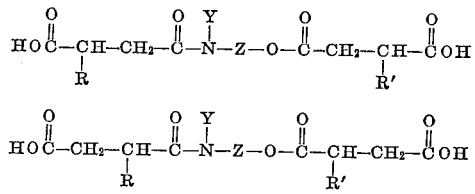

is also formed.

In general, the compositions of this invention are prepared by adding two moles of ASAA and one mole of the aminoalkanol to about 200 ml. of a suitable solvent (xylene is used in the examples), heating to 150° C., holding it at this temperature for 5–10 minutes and then allowing the reaction mixture to spontaneously cool to room temperature. The reaction vessel employed is equipped with a mechanical stirrer thermometer and a reflux condenser.

EXAMPLE 33

Two moles of tetrapropenyl succinic anhydride (532 grams) is stirred with 200 ml. of xylene and one mole of isopropanol amine

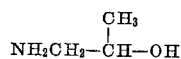

(75 grams) is then added. This mixture is then heated to reflux at 150° C., allowed to remain at this temperature for five minutes, and then allowed to cool spontaneously to room temperature. The product is the ester-amide-acid product corresponding to the reactants.

In view of the above description and the fact that the preparation of other compositions of this invention are prepared in the same manner, it would be unnecessary and repetitious to repeat the details of each preparation. Therefore, the compounds are summarized in the following Table I.

TABLE I

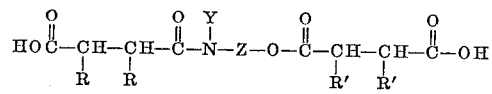

| Ex. | One of R's | One of R''s | Y | Z |
|---|---|---|---|---|
| 1 | Allyl | Allyl | H | $CH_3$ <br> $-CH_2-\overset{|}{C}H-$ |
| 2 | ----do---- | ----do---- | $CH_3$ | Same as Ex. 1. |
| 3 | ----do---- | ----do---- | $C_2H_5$ | Do. |
| 4 | ----do---- | ----do---- | H | $CH_3$ <br> $CH_2$ <br> $-CH_2-\overset{|}{C}H-$ |
| 5 | ----do---- | ----do---- | $CH_3$ | Same as Ex. 4. |
| 6 | ----do---- | ----do---- | H | $-CH_2-CH-$ <br> (phenyl) |
| 7 | Allyl | Allyl | $CH_3$ | Same as Ex. 6. |
| 8 | ----do---- | ----do---- | H | $-(CH_2)_3-$ |
| 9 | Octenyl (Straight Chain) | Octenyl (Straight Chain) | H | $CH_3$ <br> $-CH_2-\overset{|}{C}H-$ |
| 10 | ----do---- | ----do---- | $CH_3$ | Same as Ex. 9. |
| 11 | ----do---- | ----do---- | $C_2H_5$ | Do. |
| 12 | ----do---- | ----do---- | H | $CH_3$ <br> $CH_2$ <br> $-CH_2-\overset{|}{C}H-$ |
| 13 | ----do---- | ----do---- | $CH_3$ | Same as Ex. 12. |
| 14 | ----do---- | ----do---- | H | $-CH_2-CH-$ <br> (phenyl) |
| 15 | ----do---- | ----do---- | $CH_3$ | Same as Ex. 14. |
| 16 | ----do---- | ----do---- | H | $-(CH_2)_3-$ |
| 17 | Octenyl (Branched) | Octenyl (Branched) | H | $CH_3$ <br> $-CH_2-\overset{|}{C}H-$ |
| 18 | ----do---- | ----do---- | $CH_3$ | Same as Ex. 17. |
| 19 | ----do---- | ----do---- | $C_2H_5$ | Do. |
| 20 | ----do---- | ----do---- | H | $CH_3$ <br> $CH_2$ <br> $-CH_2-\overset{|}{C}H-$ |
| 21 | ----do---- | ----do---- | $CH_3$ | Same as Ex. 20. |
| 22 | ----do---- | ----do---- | H | $-CH_2-CH-$ <br> (phenyl) |
| 23 | ----do---- | ----do---- | $CH_3$ | Same as Ex. 22. |
| 24 | ----do---- | ----do---- | H | $-(CH_2)_3-$ |
| 25 | Decenyl (Straight Chain) | Decenyl (Straight Chain) | H | $CH_3$ <br> $-CH_2-\overset{|}{C}H-$ |
| 26 | ----do---- | ----do---- | $CH_3$ | Same as Ex. 25. |
| 27 | ----do---- | ----do---- | $C_2H_5$ | Do. |
| 28 | ----do---- | ----do---- | H | $CH_2$ <br> $CH_2$ <br> $-CH_2-\overset{|}{C}H-$ |
| 29 | ----do---- | ----do---- | $CH_3$ | Same as Ex. 28. |
| 30 | ----do---- | ----do---- | H | $-CH_2-CH-$ <br> (phenyl) |
| 31 | ----do---- | ----do---- | $CH_3$ | Same as Ex. 30. |
| 32 | ----do---- | ----do---- | H | $-(CH_2)_3-$ |
| 33 | Tetrapropenyl | Tetrapropenyl | H | $CH_3$ <br> $-CH_2-\overset{|}{C}H-$ |
| 34 | ----do---- | ----do---- | $CH_3$ | Same as Ex. 33. |
| 35 | ----do---- | ----do---- | $C_2H_5$ | Do. |
| 36 | ----do---- | ----do---- | H | $CH_3$ <br> $CH_2$ <br> $-CH_2-\overset{|}{C}H-$ |
| 37 | ----do---- | ----do---- | $CH_3$ | Same as Ex. 36. |

| Ex. | One of R's | One of R''s | Y | Z |
|---|---|---|---|---|
| 38 | Tetrapropenyl | Tetrapropenyl | H | —CH₂—CH—(C₆H₅) |
| 39 | ...do... | ...do... | CH₃ | Same as Ex. 38. |
| 40 | ...do... | ...do... | H | —(CH₂)₃— |
| 41 | Triisobutenyl | Triisobutenyl | H | —CH₂—CH(CH₂CH₃)— |
| 42 | ...do... | ...do... | CH₃ | Same as Ex. 41. |
| 43 | ...do... | ...do... | C₂H₅ | Do. |
| 44 | ...do... | ...do... | H | —CH₂—CH(CH₂CH₃)— |
| 45 | ...do... | ...do... | CH₃ | Same as Ex. 44. |
| 46 | ...do... | ...do... | H | —CH₂—CH—(C₆H₅) |
| 47 | ...do... | ...do... | CH₃ | Same as Ex. 46. |
| 48 | ...do... | ...do... | H | —(CH₂)₃— |
| 49 | Dodecenyl (Straight Chain) | Dodecenyl (Straight Chain) | H | —CH₂—CH(CH₃)— |
| 50 | ...do... | ...do... | CH₃ | Same as Ex. 49. |
| 51 | ...do... | ...do... | C₂H₅ | Do. |
| 52 | ...do... | ...do... | H | —CH₂—CH(CH₂CH₃)— |
| 53 | ...do... | ...do... | CH₃ | Same as Ex. 52. |
| 54 | ...do... | ...do... | H | —CH₂—CH—(C₆H₅) |
| 55 | ...do... | ...do... | CH₃ | Same as Ex. 54. |
| 56 | ...do... | ...do... | H | —(CH₂)₃— |
| 57 | Tetradecenyl (Straight Chain) | Tetradecenyl (Straight Chain) | H | —CH₂—CH(CH₃)— |
| 58 | ...do... | ...do... | CH₃ | Same as Ex. 57. |
| 59 | ...do... | ...do... | C₂H₅ | Do. |
| 60 | ...do... | ...do... | H | —CH₂—CH(CH₂CH₃)— |
| 61 | ...do... | ...do... | CH₃ | Same as Ex. 60. |
| 62 | ...do... | ...do... | H | —CH₂—CH—(C₆H₅) |
| 63 | ...do... | ...do... | CH₃ | Same as Ex. 62. |
| 64 | ...do... | ...do... | H | —(CH₂)₃— |
| 65 | Heptadecenyl (Straight Chain) | Heptadecenyl (Straight Chain) | H | —CH₂—CH(CH₃)— |
| 66 | ...do... | ...do... | CH₃ | Same as Ex. 65. |
| 67 | ...do... | ...do... | C₂H₅ | Do. |
| 68 | Heptadecenyl (Straight Chain) | Heptadecenyl (Straight Chain) | H | —CH₂—CH(CH₂CH₃)— |
| 69 | ...do... | ...do... | CH₃ | Same as Ex. 68. |
| 70 | ...do... | ...do... | H | —CH₂—CH—(C₆H₅) |
| 71 | ...do... | ...do... | CH₃ | Same as Ex. 71. |
| 72 | ...do... | ...do... | H | —(CH₂)₃— |
| 73 | Octadecenyl (Straight Chain) | Octadecenyl (Straight Chain) | H | —CH₂—CH(CH₃)— |
| 74 | ...do... | ...do... | CH₃ | Same as Ex. 73. |
| 75 | ...do... | ...do... | C₂H₅ | Do. |
| 76 | ...do... | ...do... | H | —CH₂—CH(CH₂CH₃)— |
| 77 | ...do... | ...do... | CH₃ | Same as Ex. 76. |
| 78 | ...do... | ...do... | H | —CH₂—CH—(C₆H₅) |
| 79 | ...do... | ...do... | CH₃ | Same as Ex. 78. |
| 80 | ...do... | ...do... | H | —(CH₂)₃— |
| 81 | Tricosenyl (Straight Chain) | Tricosenyl (Straight Chain) | H | —CH₂—CH(CH₃)— |
| 82 | ...do... | ...do... | CH₃ | Same as Ex. 81. |
| 83 | ...do... | ...do... | C₂H₅ | Do. |
| 84 | ...do... | ...do... | H | —CH₂—CH(CH₂CH₃)— |
| 85 | ...do... | ...do... | CH₃ | Same as Ex. 84. |
| 86 | ...do... | ...do... | H | —CH₂—CH—(C₆H₅) |
| 87 | ...do... | ...do... | CH₃ | Same as Ex. 86. |
| 88 | ...do... | ...do... | H | —(CH₂)₃— |
| 89 | Mixed C₆₋₈ (Alkenyl) | Mixed C₆₋₈ (Alkenyl) | H | —CH₂—CH(CH₃)— |
| 90 | ...do... | ...do... | CH₃ | Same as Ex. 89. |
| 91 | ...do... | ...do... | C₂H₅ | Do. |
| 92 | ...do... | ...do... | H | —CH₂—CH(CH₂CH₃)— |
| 93 | ...do... | ...do... | CH₃ | Same as Ex. 92. |
| 94 | ...do... | ...do... | H | —CH₂—CH—(C₆H₅) |
| 95 | ...do... | ...do... | CH₃ | Same as Ex. 94. |
| 96 | ...do... | ...do... | H | —(CH₂)₃— |

| Ex. | One of R's | One of R''s | Y | Z |
|---|---|---|---|---|
| 97 | Mixed C$_{8-10}$ (Alkenyl). | Mixed C$_{8-10}$ (Alkenyl). | H | —CH$_2$—CH—$\mid$CH$_3$ |
| 98 | ----do---- | ----do---- | CH$_3$ | Same as Ex. 97. |
| 99 | ----do---- | ----do---- | C$_2$H$_5$ | Do. |
| 100 | ----do---- | ----do---- | H | —CH$_2$—CH—$\mid$CH$_2$$\mid$CH$_3$ |
| 101 | ----do---- | ----do---- | CH$_3$ | Same as Ex. 100. |
| 102 | ----do---- | ----do---- | H | —CH$_2$—CH—$\mid$C$_6$H$_5$ |
| 103 | ----do---- | ----do---- | CH$_3$ | Same as Ex. 102. |
| 104 | ----do---- | ----do---- | H | —(CH$_2$)$_3$— |
| 105 | Mixed C$_{10-12}$ (Alkenyl). | Mixed C$_{10-12}$ (Alkenyl). | H | —CH$_2$—CH—$\mid$CH$_3$ |
| 106 | ----do---- | ----do---- | CH$_3$ | Same as Ex. 105. |
| 107 | ----do---- | ----do---- | C$_2$H$_5$ | Do. |
| 108 | ----do---- | ----do---- | H | —CH$_2$—CH—$\mid$CH$_2$$\mid$CH$_3$ |
| 109 | ----do---- | ----do---- | CH$_3$ | Same as Ex. 108. |
| 110 | ----do---- | ----do---- | H | —CH$_2$—CH—$\mid$C$_6$H$_5$ |
| 111 | ----do---- | ----do---- | CH$_3$ | Same as Ex. 110. |
| 112 | ----do---- | ----do---- | H | —(CH$_2$)$_3$— |
| 113 | Octenyl (Branched). | Tetrapropenyl | H | —CH$_2$—CH—$\mid$CH$_3$ |
| 114 | ----do---- | ----do---- | CH$_3$ | Same as Ex. 113. |
| 115 | ----do---- | ----do---- | C$_2$H$_5$ | Do. |
| 116 | ----do---- | ----do---- | H | —CH$_2$CH—$\mid$CH$_2$$\mid$CH$_3$ |
| 117 | ----do---- | ----do---- | CH$_3$ | Same as Ex. 116. |
| 118 | ----do---- | ----do---- | H | —CH$_2$—CH—$\mid$C$_6$H$_5$ |
| 119 | ----do---- | ----do---- | CH$_3$ | Same as Ex. 118. |
| 120 | ----do---- | ----do---- | H | —(CH$_2$)$_3$— |
| 121 | Tetrapropenyl | ----do---- | H | —CH$_2$—CH$_2$— |

Unexpectedly, the reaction product produced from aminoalkanol where Z has less than 3 carbon atoms is unsatisfactory for many uses. Thus, the composition prepared by reacting two moles of tetrapropenyl succinic anhydride and one mole of ethanolamine (Example 121) is unsatisfactory for many of the uses disclosed herein.

1. Use as an oil well corrosion inhibitor

This phase of the invention relates to the use of the ester-amide-acid compound in preventing the corrosion of metals and particularly iron, steel and ferrous alloys. More specifically, this phase of the invention relates to the inhibition of corrosion in the petroleum industry with specific reference to producing wells, pipe lines, refineries, tank storage, etc.

The use of a corrosion inhibiting agent in the oil industry and other industries, and particularly for the protection of ferrous metals, is well known. For example, see U.S. Patents Nos. 2,736,658 dated Feb. 28, 1954, to Pfohl et al., and 2,756,211 dated July 24, 1956, to Jones and 2,727,003 dated Dec. 13 1955 to Hughes.

More specifically then and particularly from the standpoint of oil production, this aspect of the invention relates to inhibiting corrosion caused by corrosive oil well fluids containing for example hydrogen sulfide, carbon dioxide, inorganic acids, organic acids, combinations of each with oxygen, and with each other and oxygen. More particularly, it relates to treating oil and gas wells to mitigate metal corrosion and associated difficulties.

It should also be pointed out that the corrosiveness of oil well brines will vary from well to well, and the proportion of corrosion inhibiting agent added to the well fluids should also be varied from well to well. Thus, in some wells it may be possible to effectively control corrosion by the addition of as little as 5 p.p.m. of these compositions to the well fluids, whereas in other wells, it may be necessary to add 200–1,000 p.p.m. or more. However, these compounds are generally effective in concentrations of 8 to 300 p.p.m., but preferably 10 to 60 p.p.m.

For the protection of gas wells and gas-condensate wells the amount of corrosion inhibitor required will vary depending upon the amount and type of corrosive agent in the gas and the amount of liquid hydrocarbon and water produced. In general, the amount of the compound required will range from 3 to 50 or more parts but preferably from 5 to 15 parts per million cubic feet of gas produced.

In using these improved compositions for protecting oil well tubing, casing and other equipment which comes in contact with the corrosive oil-brine production, one finds that excellent results are obtained by injecting an appropriate quantity of a selected composition into a producing well so that it mingles with the oil-brine mixture and comes into contact with the casing, tubing, pumps and other producing equipment. One may, for example, introduce the inhibiting composition into the top of the casing, thus causing it to flow down into the well and thence back through the tubing, etc. In general, it has been found that this procedure suffices to inhibit corrosion throughout the entire system of production and collection, even including field tankage.

In case serious emulsion or gel problems are encountered, demulsifiers are advantageously added. This is important not only to avoid the troublesome emulsions and gels themselves, but also to improve corrosion inhibition. The explanation of less effective corrosion inhibition in the presence of emulsions apparently is that the inhibitor is somewhat surface-active. That is, it is concentrated at interfacial surfaces. Since this surface is great in an emulsion, most of the inhibitor will be concentrated in these interfaces and little will remain in the body of the oil for deposition on the metal surfaces. In many wells, oil-in-water type emulsions often occur naturally. In such wells the inhibitors herein described tending to form water-in-oil type emulsions, often decrease the emulsion problems naturally present. Thus, in addition to being effective corrosion inhibitors, the herein described products tend to eliminate emulsion problems which sometimes appear when some of the present day inhibitors are used in oil wells or refinery processing.

The method of carrying out this process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, inorganic or organic acids and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner surface of all well-head fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "boll weevil" device or similar arrangement. Where the inhibitor is a solid, it may be dropped into the well as a solid lump or stick, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel, after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosine, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inhibitor is especially convenient. These are prepared by blending the inhibitor with a mineral wax, asphalt or resin in a proportion sufficient to give a moderately hard and high-melting solid which can be handled and fed into the well conveniently. These are described in U.S. Patents 2,559,384 and 2,559,385.

These corrosion inhibitors can be used in combination with other well-known corrosion inhibitors, for example, those containing the cyclic amidine structures, the amido cyclic amidine structures, and the amino cyclic amidine structures, as disclosed in the Blair and Gross Reissue Patent No. 23,227. When the herein described products are mixed with corrosion inhibitors of the conventional type in the ratio of one-to-three, one-to-one, three-to-one, or the like, in numerous instances the effectiveness of the corrosion inhibitor thus obtained is often significantly greater than the use of either one alone.

The following examples are presented to illustrate the use of the instant compounds as oil well corrosion inhibitors:

STATIC WEIGHT LOSS TESTS:

These tests are run on both synthetic and naturally occurring fluids. The test procedure involves the measurement of the corrosive action of the fluids inhibited by the compositions herein described upon sandblasted S.A.E. 1020 steel coupons measuring ⅞ x 3¼ inches under conditions approximating those found in an actual producing well, and the comparison thereof with results obtained by subjecting identical test coupons to the corrosive action of identical fluids containing no inhibitor.

Clean pint bottles are charged with 200 ml. of 10% sodium chloride solution saturated with hydrogen sulfide and 200 ml. of mineral spirits and a predetermined amount of inhibitor are then added. In all cases the inhibitor concentrations are based on the total volume of fluid. Weighed coupons are then added, the bottles tightly sealed and allowed to remain at room temperature for 3 days. The coupons are then removed, cleaned by immersion in inhibited 10% hydrochloric acid, dried and weighed.

The changes in the weight of the coupons during the corrosion test taken as a measurement of the effectiveness of the inhibitor compositions. Protection percentage are calculated for each test coupon taken from the inhibited fluids in accordance with the following formula:

$$\frac{L_1 - L_2}{L_1} \times 100 = \text{percent protection}$$

in which $L_1$ is the loss in weight of the coupons taken from unhibited fluids and $L_2$ is the loss in weight of coupons which are subjected to the inhibited fluids.

The compounds shown in Table II in 100 p.p.m. tested in this manner, substantially diminish the corrosive action of oil well fluids.

TABLE II.—USE AS AN OIL WELL CORROSION INHIBITOR

| Test: | Compound, example |
|---|---|
| 1-1 | 1 |
| 1-2 | 11 |
| 1-3 | 14 |
| 1-4 | 17 |
| 1-5 | 19 |
| 1-6 | 22 |
| 1-7 | 32 |
| 1-8 | 33 |
| 1-9 | 38 |
| 1-10 | 43 |
| 1-11 | 48 |
| 1-12 | 55 |
| 1-13 | 62 |
| 1-14 | 71 |
| 1-15 | 74 |
| 1-16 | 78 |
| 1-17 | 76 |
| 1-18 | 107 |
| 1-19 | 113 |

2. *Use as a corrosion inhibitor for refined petroleum*

This phase of the invention relates to corrosion inhibited refined petroleum products, and in particular concerns refined petroleum products, oil compositions adapted to protect ferrous and other metal surfaces with which they came in contact from rusting and other types of corrosion. Still more, this phase of the invention relates to a method and composition for inhibiting the rusting characteristics of petroleum distillates.

As is well known, simple films of petroleum products afford only limited protection to metal surfaces against rusting and other types of corrosion and in general cannot be relied upon to provide sufficient protection in the presence of moisture or even under conditions of high humidity. This is true, even though the petroleum products are relatively pure and substantially free of the naturally corrosive components present in oil issuing from an oil well which contains naturally occurring corrosive agents such $H_2S$, $CO_2$, inorganic and organic acids, combinations thereof, etc.

One problem which exists in the handling and use of refined petroleum products, such as petroleum distillates, is the rusting which frequently occurs in storage containers such as pipelines, storage tanks, engines, etc. In order to reduce and overcome the problems, many solutions have been suggested. As a matter of fact, a great amount of technical consideration is now being given to the discovery of effective rust inhibitors for petroleum products. The rusting problem which occurs in storing and using petroleum products occurs usually as the result of traces of moisture which are inevitably present in petroleum distillates. Moisture finds its way into the distillates in a variety of ways. While water is not appreciably soluble in petroleum distillates traces of moisture are, in fact, dissolved in heating oil, gasoline, kerosene, jet fuels, etc. Again, it is impossible to prevent entrainment of moisture in such products during storage and handling. In this connection, for example, storage tanks are generally provided with breather devices to permit the intake and exhaust of air during atmospheric temperature changes. As a result, cooked, moisture-laden air is generally drawn into a storage tank at night, resulting in the condensation of moisture in the tank. A portion of this moisture is dissolved in or entrained in petroleum products when pumped from the storage tanks.

I have now discovered that refined petroleum products, for example petroleum distillates, containing minor amounts of our composition, for example at least 5 p.p.m., for example 15 to 200 p.p.m., or more, but preferably 50 to 100 p.p.m. effectively inhibit the rusting and corrosion of metals, particularly ferrous metals without adversely affecting the properties of the petroleum products.

The following examples are presented to illustrate the instant compounds as corrosion inhibitors for refined petroleum:

I. Stirring tests

These tests are run on synthetic fluids. The procedure involves the comparison of the amount of iron in solution after a predetermined interval of time of contact of a standardized iron surface wtih a two-phase corrosive medium with similar determinations in systems containing inhibitors.

Six hundred ml. beakers equipped with stirrers and heaters are charged with 400 ml. of 10% sodium chloride containing 100 p.p.m. acetic acid and 100 ml. of mineral spirits. The liquids are brought to temperature and a 1 x 1 inch sand blasted coupon is suspended by means of a glass hook approximately midway into the liquid phase of the beaker. The stirrer is adjusted to agitate the liquids at such a rate as to provide good mixing of the two layers.

After 30 minutes, samples of the aqueous phase are taken and the iron content of each sample is determined by measuring the color formed by the addition of hydrochloric acid and potassium thiocyanate in a photoelectric colorimeter.

The protection afforded by an inhibitor is measured by comparison of the amount of light absorbed by inhibited and uninhibited samples run simultaneously. Percent protection can be determined by the following formula:

$$\frac{A_1-A_2}{A_1} \times 100 = \text{percent protection}$$

where $A_1$ is the present light absorbed by an uninhibited sample and $A_2$ is the same value for an inhibited sample. These stirring tests are run at three different temperatures, i.e., room temperature, 140° F. and at 180° F. The compounds shown in Table III, tested in this manner in concentrations of 40 p.p.m., substantially reduce corrosion.

II. Stirring test at high acetic acid concentration

The above stirring tests are repeated except that the corrosive solution contains 500 p.p.m. of acetic acid instead of 100 p.p.m. The compounds shown in Table III, tested in this manner at concentrations of 100 p.p.m., substantially reduce corrosion.

III. Stirring Test I containing persulfate

In order to demonstrate the effectiveness in a very highly corrosive solution Stirring Test I is repeated except that the corrosive solution also contains 0.2% ammonium persulfate. The compounds shown in Table III, tested in this manner at 1,200 p.p.m., substantially reduce corrosion.

IV. Static rust test

Weighed coupons are dipped into mineral spirits containing the present composition (100 p.p.m.) for one hour followed by treatment for one week with distilled and synthetic sea water. The coupons are then cleaned with inhibited 10% HCl, dried and weighed and the weight loss noted. The compounds shown in Table III, tested in this manner, substantially reduce corrosion.

V. Tanker tests (cycle tests)

This test is described by Malcolmson et al. (Annual meeting of the Society of Naval Architects and Marine Engineers, New York, November 1952). It involves the measurement by weight loss of coupons which have been subjected to the corrosive action of sea water and a hydrocarbon (here gasoline) for a week, followed by contact for one week with sea water and air, and the comparison to the weight loss of coupons subjected to a similar test in which a small amount of inhibitor has been added to the hydrocarbon phase (here gasoline). The compounds shown in Table III, tested at 100 p.p.m. substantially reduce corrosion.

TABLE III.—USE AS CORROSION INHIBITOR FOR REFINED PETROLEUM

| Test: | Compound, examples |
|---|---|
| 2–1 | 1 |
| 2–2 | 11 |
| 2–3 | 14 |
| 2–4 | 17 |
| 2–5 | 19 |
| 2–6 | 22 |
| 2–7 | 32 |
| 2–8 | 33 |
| 2–9 | 38 |
| 2–10 | 43 |
| 2–11 | 48 |
| 2–12 | 55 |
| 2–13 | 62 |
| 2–14 | 71 |
| 2–15 | 74 |
| 2–16 | 78 |
| 2–17 | 76 |
| 2–18 | 107 |
| 2–19 | 113 |

Similarly effective corrosion inhibition is observed with lubricating oil, for example, a turbine oil having the following characteristics:

| | |
|---|---|
| Degrees, API | 32.7 |
| Flash ° F. | 385 |
| Pour | 15/0 |
| Color, Saybolt | 30 |
| SSU, 100° F. | 150 | with various grades of gasoline including those shown in Section 4 of this present application; and jet fuels, for example, those meeting JP–1 through JP–6 specifications.

3. Additives for slushing oils

These new compositions of matter inhibit or prevent the corrosion or rusting of metals when applied thereto in the form of a coating.

In the shipping and storage of metal articles, particularly ferrous metal articles having machined surfaces, it is highly desirable to protect such articles from the corrosion and rusting which normally occur when metal surfaces are exposed to the atmosphere for any length of time. While such protection should remain effective over long periods of time under very adverse conditions of humidity, it should likewise be of such nature that it can readily be removed when it is desired to place the metal article into use. Among the various means employed for providing such protection against corrosion, that of applying a film or coating of a corrosion inhibiting liquid composition to the metal surface has enjoyed widest use by reason of its economy and adaptability to all sorts of metal articles ranging from simple pieces to complicated machine assemblies. Such liquid corrosion preventive compositions often comprise a mineral or other non-drying oil base having a corrosion preventive material dispersed or dissolved therein, and are hence usually referred to generically as "slushing oils" even though in some instances they may not actually contain an oil.

The slushing oils heretofore employed, however, have been subject to numerous disadvantages. In some instances they have been too expensive for widespread general use whereas in others they are too difficult to remove from surfaces to which they have been applied. Many of them have not proved effective over sufficiently long periods of time, or have not provided the desired degree of protection against corrosion under extreme climatic conditions such as those encountered in the tropics or at sea.

It has been found that the compositions of this invention are capable of use in inhibiting or preventing the corrosion or rusting of metal surfaces over long periods of time and under adverse climatic conditions.

They can readily be dissolved or dispersed in a suitable liquid vehicle to form inexpensive and highly effective slushing oil compositions.

While the above-described reaction products can be employed per se in inhibiting or preventing the corrosion or rusting of metals, by reason of their high viscosity they are more readily applied to metal surfaces in the form of a solution or dispersion in a liquid vehicle. For example, they are dissolved in a relatively light organic solvent, such as hexane, benzene, petroleum ether, carbon tetrachloride, or a light naphtha to form slushing oil compositions of a viscosity suitable for application to metal surfaces by dipping, brushing, or spraying procedures. Such light solvent will evaporate leaving a thin protective coating of the corrosion inhibiting reaction product on the metal surface. When it is desired to use the metal article thus protected, the corrosion preventive coating may readily be removed by washing with a suitable solvent. Gasoline is an excellent solvent for this purpose since it is cheap and universally available. The light petroleum distillate known as Stoddard solvent has been found particularly suitable for use as the solvent in preparing liquid protective coating compositions comprising the new corrosion preventives, and may also be used in the subsequent removal of the protective coating.

The amount (by weight) of solvent employed will depend upon the nature of the solvent itself as well as upon the thickness of the coating desired on the metal surface, such as from 1 to 99%, for example from 5 to 95%, but preferably 10 to 90%. Ordinarily, however, suitable compositions will contain up to about 90 percent, preferably between about 50 and about 90 percent, by weight of the solvent. When it is desired to apply a thick corrosion preventive coating, the amount of solvent is kept near the minimum, whereas if a thin coating is preferred, the amount of solvent may be considerably increased. For most application, a composition comprising equal parts of solvent and the corrosion preventive material will be found very satisfactory.

In addition to being employed per se or in the form of the above-described liquid coating compositions, the corrosion preventive reactions products of the present invention may advantageously be employed in conjunction with other corrosion inhibitors, particularly the so-called "Alox" corrosion preventives manufactured by the Alox Corporation. These latter products are complex mixtures containing hydrocarbons, secondary, and tertiary aliphatic alcohols, aliphatic ketones, keto-alcohols, and high molecular weight saturated aliphatic carboxylic and hydroxy-carboxylic acids. They are obtained by the Burwell process of partially oxidizing petroleum hydrocarbons in the liquid phase at elevated temperatures and pressures as disclosed in U.S. Patents Nos. 1,690,768 and 1,690,769.

In employing the new corrosion preventive reaction products of the present invention in conjunction with such oxidized petroleum hydrocarbon corrosion preventives, the relative proportions of the two products may be varied between wide limits depending upon the degree of corrosion protection desired and the particular products employed.

As with the new corrosion preventive reaction products themselves, the mixtures thereof with the oxidized petroleum hydrocarbon corrosion preventives may be employed per se in applying corrosion preventive coatings to metal surfaces, but are usually more conveniently employed in the form of a solution or dispersion in a suitable liquid vehicle, e.g. Stoddard solvent, benzene, naphtha, etc.

In addition, a variety of other solvents or liquid dispersing media may be employed to prepare a wide variety of corrosion protective compositions whose physical properties are adapted to particular application. Thus, the reaction products herein disclosed may be dissolved or dispersed in heavier oils or the like or even in petrolatum to provide thick liquid or grease-like compositions.

In order to evaluate the present compositions as slushing agents, the following tests are carried out:

I. Weighed coupons are coated with the compounds shown in the following table by dipping them into a 10% solution of these compositions in a petrolatum oil. Additional weighed coupons are left uncoated as a control. The coupons are then immersed in distilled and synthetic sea water for a period of one week. These coupons are then removed, cleaned by immersion in inhibited 10% HCl, dried and weighed. The weight loss indicates the protection offered by the composition.

The compounds shown in Table IV, tested in this manner substantially diminish corrosion.

The petrolatum oil referred to above is an oil separated in the deoiling of petrolatum stock used in the preparation of residual microcrystalline wax. This oil is described in the above Bruce Clary article and is separated by a procedure shown in FIGURE 1 of that article on Page 19, under the Residual Micro Wax flow sheet under

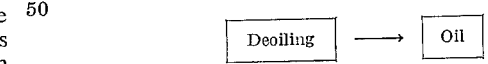

which follows

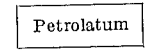

This oil, which is often referred to as "V-Oil" has a molecular weight of about 500, is relatively paraffinic, has a viscosity index of about 130, density of about 0.82 at 210° F. and a viscosity-gravity constant of about 0.79. Various correlative methods indicate that each molecule contains an average of 6 naphthenic and 3 aromatic carbon atoms. It contains no materials which will complex with urea, indicating that it is highly branched. It has the following specifications:

| | | |
|---|---|---|
| Flash | min | 400° F. |
| Gravity (API) | | 26/32 |
| Color | | dark |
| Visc. 210 (Saybolt) | | 80/120 |
| Cold Test | | 70/110 |
| B.S.&W. | mx | 1% |

II. The above procedure is also repeated employing mineral spirits.

The compositions shown in Table IV, tested in this manner substantially diminished corrosion.

TABLE IV.—SLUSHING OIL ADDITIVES

| Test: | Compound, Example |
|---|---|
| 3-1 | 1 |
| 3-2 | 11 |
| 3-3 | 14 |
| 3-4 | 17 |
| 3-5 | 19 |
| 3-6 | 22 |
| 3-7 | 32 |
| 3-8 | 33 |
| 3-9 | 38 |
| 3-10 | 43 |
| 3-11 | 48 |
| 3-12 | 55 |
| 3-13 | 62 |
| 3-14 | 71 |
| 3-15 | 74 |
| 3-16 | 78 |
| 3-17 | 76 |
| 3-18 | 107 |
| 3-19 | 113 |

4. Miscellaneous anti-corrosive uses

In addition, the present compositions are utilizable for numerous purposes. They can be added to a wide variety of vehicles to produce anti-corrosive compositions. They can be dissolved in the vehicle, or they can be dispersed therein in the form of suspension or emulsions.

The vehicles can be liquids or plastics, the basic requirement being that they must be spreadable over metal surfaces. Spreading may be accomplished by immersion, flooding, spraying, brushing, trowelling, etc. It can be oleaginous, i.e., substantially insoluble in water, or it can be aqueous. Aqueous vehicles include aqueous solutions of liquid, such as alcohol-water mixtures and the like. Oleaginous vehicles can be hydrocarbon materials, such as mineral oils and hydrocarbon solvents, or non-hydrocarbon materials, such as fatty oils and fats.

Non-limiting examples of suitable vehicles for the additives of this invention are mineral lubricating oils of all grades; gasolines and other light petroleum products, such as fuel oil; water; alcohols, such as ethanol, isopropanol, butanol, cyclohexanol, methylcyclohexanol, octanol, decanol, dodecanol, hexadecanol, octadecanol, oleyl alcohol, benzyl alcohol, etc.; phenols; glycols, such as ethylene glycol, propylene glycol, butylene glycol, glycerol, etc.; ketones, such as acetone, methyl ethyl ketone, dipropyl ketone, cyclohexanone, etc.; keto alcohols, such as acetol; ethers, such as diethyl ether, dipropyl ether, diethylene dioxide, dichloro diethyl ether, diphenyl oxide, diethylene glycol, triethylene glycol, ethylene glycol monobutyl ether, etc.; natural esters, such as ethyl acetate, butyl propionate, cresyl acetate, dodecyl acetate, ethyl maleate, butyl stearate, tridecyl phosphate, tributyl trithiophosphate, triamyl phosphite, etc.; petroleum waxes, such as slack wax and paraffin wax; natural waxes such as carnauba wax, japan wax, beeswax, etc.; natural fats and oils, such as sperm oil, tallow, cottonseed oil, castor oil, linseed oil, tung oil, soy bean oil, oiticica oil, tar oil, oleo oil, etc.; hydrocarbons and halogenated hydrocarbons, such as butanes, chlorinated hexanes, octanes, brominated decanes, dodecanes. Freon, eicosane, benzene, toluene, xylene, cumene, indene, alkyl naphthalenes, etc.; greases; asphalts; chlorinated petroleum fractions, such as chlorowax; and paints, varnishes and the like.

As those skilled in the art will readily appreciate, the applications of the compositions of the present invention are many. Lubricating oils of all types usually permit corrosion of metal surfaces. This poses a problem in the lubricating of all types of engines, particularly steam turbines. Lubricating oils containing the reaction products of this invention are effectively inhibited against such corrosion. Diesel fuels containing these additives will have less tendency to corrode injection nozzles. Steam cylinder oils and cutting oils can be inhibited against corrosive tendencies by the addition thereto of these new additives, particularly the more emulsive types. Greases can be inhibited likewise. Additionally, the more emulsive products of this invention can be substituted in whole or in part for the emulsifying agents commonly used in compounding greases, cutting oils, steam cylinder oils, etc. Hydraulic systems can be protected against corrosion by using hydraulic fluids containing the additives of the present invention.

The storage of infrequently used machinery, and the shipment and storage of metal shapes and metal parts, such as machined sewing machine parts or gun parts, present corrosion problems. Such corrosion can be prevented by treating them with slushing oils containing the additives of this invention, by coating them with organic solvent solutions or dispersions of these additives, such as the benzene solutions described hereinbefore, or by treating the surfaces thereof with dispersions of these additives in water. Corrosive tendencies of coolants and antifreeze solutions or mixtures, such as those used as coolants in internal combustion engines, can be reduced by addition thereto of the reaction products of this invention. Such antifreezes include water, alcohol-water, glycols, glycol-water, etc. When gasoline and other fuels are stored in drums or tanks, water often enters the storage space, as by "breathing," and corrodes the inner surfaces thereof. This can be prevented through the use of the additives contemplated herein.

Relatively more permanent corrosion-preventive coatings can be produced by the application to metal surfaces of paints, and the like, containing the additives of this invention. Vehicles utilizable for this purpose are paints, varnishes, lacquers, drying oils, asphalt roofing compositions, and the like.

The amount of the reaction products which are added to a vehicle to produce a composition in accordance with this invention varies between about 0.001 percent and about 50 percent or more by weight, depending on the specific use contemplated and on the specific reaction products selected. Generally, it is sufficient to use an amount varying between 0.01 percent and about 10 percent. However, smaller amounts, as low as about 0.001 percent, will be effective in some cases. Likewise, amounts up to as much as about 50 percent or more are required when the vehicle contains resinous bodies, or when the reaction product is also used as an emulsifier, such as in a steam cylinder oil.

Other substances in addition to the reaction products of this invention can be added to the compositions contemplated herein to impart other desirable properties thereto. For example, there may be added antioxidants, pour point depressants, V.I. improvers, antidetonants, cetane number improvers, emulsifiers, thinners, driers etc.

5. Use as lead scavengers and anti-fouling agents

This phase of the present invention relates to an improved leaded gasoline for an internal combustion engine employing an electric spark for igniting the combustible fuel mixture and to an improved method of operating such.

The use of lead compounds in gasolines to increase the octane ratings thereof is extremely widespread. There are, however, several rather serious adverse effects which accompany the use of leaded gasolines. One of these effects, the deposition of various lead compounds within the combustion chambers of the engines, has been at least partially remedied by the use of halohydrocarbon scavengers such as ethylene dibromide. Another adverse effect, which has been attributed to the lead anti-knock compounds, is mis-firing of the engine due to spark plug fouling. This spark plug fouling is quite prevalent under conditions of high temperature engine operation and, particularly in the case of aircraft engines, is a very serious type of trouble.

It has been now found that the use, as a lead scavenger in leaded gasoline fuel compositions, of a mixture of a halohydrocarbon scavenger and of a smaller amount of the present ester-amide-acid compounds will result in greatly improved operation of spark ignition internal combustion engines. More particularly, the use of such scavenger compositions substantially eliminates spark plug fouling, or at least minimizes such fouling to a point where it is no longer a material consideration in engine operation. This outstanding advantage is obtained without having the anti-knock characteristics of the fuel deleteriously affected by the presence of the scavenger compositions.

The ester-amide-acid compounds in the present scavenger compositions will be referred to hereinafter as "anti-fouling compounds." The halohydrocarbon will be referred to as "halohydrocarbon scavenger compounds" or "halogen scavenger compounds."

The halohydrocarbon scavenger which makes up the major proportion of the scavenger compositions of the present invention may be, for example, any of the numerous halogen scavenger compounds already known, such as ethylene dibromide and ethylene dichloride (U.S. 2,398,-281), acetylene tetrabromide (U.S. 2,490,606), hexachloropropylene, mono- and polyhalo propanes, butanes and pentanes (U.S. 2,479,900 and U.S. 2,479,902), polyhalo alkyl benzenes (U.S. 2,479,901 and U.S. 2,479,903), and the like, having a volatility between about 100 and about 0.1 mm. Hg at 50° C.

The amount of halogen scavenger and anti-fouling compound present in the lead gasoline will be expressed as follows:

(1) Gram-moles of halogen scavenger divided by the number of halogen atoms present in the molecule (hereafter also called "halogen-gram-mole").
(2) Gram-moles of anti-fouling compound.
(3) Gram-moles of lead present in the gasoline.

When using the scavenger compositions in this phase of the present invention, the total amount or sum of halogen-gram-moles of the halogen scavenger plus the gram-moles of anti-fouling agent present will generally fall between about 1.8 and about 3 per gram moles of the lead content of the gasoline, but may advantageously be as low as 1.2 or as high as 5 or more in some cases. The preferred range is from about 2 to about 3.

The gram mole ratio of the two components of the scavenger composition is rather important, i.e., ratio of halogen-gram-moles to gram moles of ester-amide-acid. For example, if the proportion of halogen scavenger present is too large, excessive wear and corrosion of certain operating parts, such as exhaust valves and valve guides, is noted. If too small a quantity of halogen scavenger is used, the lead deposits are not effectively scavenged. If too small a quantity of the anti-fouling compound is used, the spark plug fouling will not be materially reduced; and if too much of that compound is present the amounts of deposits and the plug fouling are both increased. In general the gram-mole ratio of the halogen scavenger or scavengers to the anti-fouling agents should be between about 3:2 and about 100:1. For best results this ratio should be between about 2:1 and about 15:1. The total scavenger mixture and the ratio of components therein are advantageously adjusted so that the anti-fouling compound is present in an amount of between about 0.01 and about 1.0 gram mole or more, and preferably between about 0.05 and about 0.5 gram mole per gram mole of lead. It is preferred that the weight concentration of the anti-fouling additive in the fuel be kept below 0.1%. It is to be understood that more than one of the compounds from each class (i.e., halogen scavenger or anti-fouling agent), may be used in any single composition, just so the total quantity of each type falls within the limits set forth above.

While it is to be understood that the present compositions may be utilized in any leaded gasoline fuel, the compositions are of particular importance with respect to use in reciprocating internal combustion engine gasoline fuels, and especially such aviation fuels. This is true because of the relatively more frequent occurrence of spark plug fouling in aviation engines, with the greater inherent danger to human life in the case of failures of such engines. In addition to the lead anti-detonant and the scavenger composition, the gasoline fuels, or the concentrates for addition thereto may also contain additional corrosion inhibitors and stabilizers, such as 2,4-dimethyl-6-tertiary butylphenol and other alkyl phenols, N,N'-dibutyl-p-phenylene diamine hydroquinone, phenyl-alpha-naphthylamine, N-butyl-p-aminophenol, alpha-naphthol, etc., dyes and the like.

By the term "leaded gasoline" and the terms of similar import, is meant a petroleum fraction boiling in the gasoline hydrocarbon range (between about 50° F. and about 450° F.) to which has been added a small amount, usually between about 1 and about 6 cc. per gallon, of a metallo-organic, usually an organo-lead, anti-knock compound, such as tetra-alkyl lead, e.g., tetra-ethyl lead, tetra-isopropyl lead, etc.

The fuels to which the present scavenger compositions are added are preferably those which are relatively stable with respect to oxidation or gum formation. The stability may result from the use of stable base stocks such as aviation alkylate, straight run gasoline fractions, or other fractions which have been highly refined to remove olefins, or the stability may result from the use of oxidation stabilizers, such as those mentioned above.

As indicated above, the scavenger compositions of this invention are particularly useful in aviation gasoline. By the term "aviation gasoline" is meant a relatively high grade of gasoline fuel used in aviation engines, as distinguished from the lower quality gasolines, or "motor fuels" used in automotive engines. Aviation fuels have a more closely specified boiling range, generally running from a minimum of about 100° F. to a maximum of about 350° F. The octane number of such fuels is generally in excess of 100. Because of the demand for high quality, termally cracked fractions are never used in aviation gasolines. Catalytically cracked fractions may sometimes be used, but only after treatment to remove olefins. One of the reasons for the restrictions upon incorporation of cracked gasolines in aviation fuels is that the oxidation stability of aviation fuels must be much greater than that required for motor fuels. For example, when tested according to a method such as described in the patent issued to Thomas W. Bartram, U.S. 2,256,-187, an aviation fuel base stock will go well beyond 4 or 5 hours before the oxygen pressure will have decreased by 5 pounds per square inch.

The following examples are presented to illustrate this phase of the present invention. Tests are run using the single cylinder test procedures which deposits are accumulated for a period of 40 hours under cyclic conditions representative of different operating conditions of a motor car. The base fuel is composed of 90% catalytically cracked stock and 10% of motor alkylate with 3.0 ml. of tetraethyl lead per gallon. It is representative of commercial premium grade gasoline for automobile use. In each case, the amount of deposit recorded in the build-up deposits on the valves, spark plugs fouling, and the like is significantly less than the control which contained no ester-amide-acide compound.

The following mixtures are tested with the above gasoline:

TABLE V

| Test | Scavenger—Compound | Weight, g./gal. | Anti-Fouling Agent Compound | Anti-Fouling Agent Weight, g./gal. |
|---|---|---|---|---|
| 5-1 | Ethylene Dibromide | 2.2 | Ex. 1 | 0.5 |
| 5-2 | do | 2.2 | Ex. 11 | 1.5 |
| 5-3 | do | 2.2 | Ex. 14 | 1.0 |
| 5-4 | do | 2.2 | Ex. 17 | 1.0 |
| 5-5 | do | 2.2 | Ex. 19 | 1.0 |
| 5-6 | do | 2.2 | Ex. 22 | 0.4 |
| 5-7 | do | 2.2 | Ex. 32 | 0.6 |
| 5-8 | do | 2.2 | Ex. 33 | 0.2 |
| 5-9 | do | 2.2 | Ex. 38 | 0.4 |
| 5-10 | do | 2.2 | Ex. 43 | 1.0 |
| 5-11 | Ethylene Dibromide + Ethylene Dichloride | 0.75 / 0.75 | Ex. 48 | 0.1 |
| 5-12 | do | 0.75 | Ex. 55 | 0.5 |
| 5-13 | do | 0.75 | Ex. 62 | 1.5 |
| 5-14 | do | 0.75 | Ex. 71 | 1.5 |
| 5-15 | do | 0.75 | Ex. 74 | 1.75 |
| 5-16 | Ethylene Dibromide | 1. | Ex. 78 | 1.0 |
| 5-17 | do | 1.0 | Ex. 96 | 0.8 |
| 5-18 | do | 1.0 | Ex. 107 | 0.6 |
| 5-19 | Acetylene Tetrabromide | 2.0 | Ex. 113 | 0.2 |

The above compositions are also similarly effective in aviation grade gasolines as exemplified by a 115/130 grade aviation gasoline containing 4.6 ml. of tetraethyl lead.

From the above description it is evident that this phase of the present invention relates to a blend of gasoline of appropriate boiling range and octane number, a suitable lead compound such as tetraethyl lead in the usual range of amounts, a halohydrocarbon such as ethylene dibromide in the usual range of amounts, and a minor amount of the ester-amide-acid of the present invention, with or without other additives.

The utility of invention is that such an engine, which supplied with the described fuel in admixture with air for combustion, suffers fewer deposit-induced or "surface" ignitions and produces less spark plug fouling than when operated with the same fuel without the ester-amide-acid compound. The engine thus delivers more power, because of the reduced loss from abnormal combustion. Compared with known fuel blends having additives to attain this same objective, my fuel requires a smaller weight of additive to achieve an acceptable reduction of abnormal combustion and, further, by causing little if any deposits in the combustion space, it minimizes the increase in the octane requirement of the engine caused by the deposits.

In addition to its function as an anti-fouling agent the ester-amide-acid composition also acts as corrosion inhibitors which permit a reduction in the amount of corrosion inhibitor required or their complete elimination, with obvious economic advantage. The anti-corrosive effectiveness of these ester-amide-acid compounds has been described above.

Having thus described my invention, what I claim is new and desire to obtain by Letters Patent is:

1. A leaded petroleum distillate fuel comprising of a major amount of a leaded petroleum distillate and a minor amount sufficient to inhibit fouling of

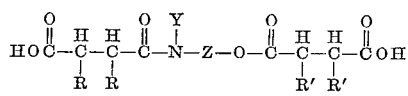

where Z is a member selected from the group consisting of an alkylene radical and an aryl substituted alkylene radical having at least three carbon atoms; wherein one each of R and R' is an alkenyl radical having at least two carbons, the other R and R' being hydrogen; and Y is a member selected from the group consisting of hydrogen and a hydrocarbon group having 1–18 carbon atoms.

2. A petroleum distillate fuel comprising therein of a major amount sufficient to inhibit corrosion of petroleum distillate fuel and a minor amount of

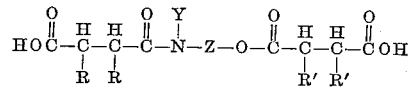

where Z is a member selected from the group consisting of an alkylene radical and an aryl substituted alkylene radical having at least three carbon atoms; wherein one each of R and R' is an alkenyl radical having at least two carbon atoms, the other R and R' being hydrogen; and Y is a member selected from the group consisting of hydrogen and a hydrocarbon group having 1–18 carbon atoms.

3. A leaded petroleum distillate fuel comprising of a major amount sufficient to inhibit fouling of leaded petroleum distillate and a minor amount of

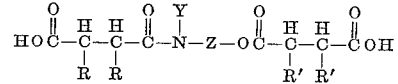

where Z is selected from the group consisting of an alkylene and an aryl substituted alkylene group having 3–12 carbon atoms; one each of R and R' is an alkenyl group having 3–32 carbon atoms, the other R and R' being hydrogen; and Y is selected from the group consisting of hydrogen and lower alkyl.

4. A petroleum distillate fuel comprising therein of a major amount sufficient to inhibit corrosion of petroleum distillate fuel and a minor amount of

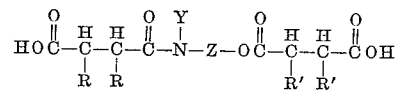

where Z is selected from the group consisting of an alkylene and an aryl substituted alkylene group having 3–12 carbon atoms; one each of R and R' is an alkenyl group having 3–32 carbon atoms; the other R and R' being hydrogen; and Y is selected from the group consisting of hydrogen and lower alkyl.

5. A leaded petroleum distillate fuel comprising therein of a major amount sufficient to inhibit fouling of a leaded petroleum distillate and a minor amount of

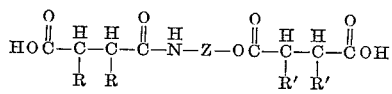

where Z is an alkylene group having 3–8 carbon atoms, and one each of R and R' is an alkenyl group having 8–18 carbon atoms, the other R and R' being hydrogen.

6. A petroleum distillate fuel comprising therein of a major amount sufficient to inhibit corrosion of a petroleum distillate fuel and a minor amount of

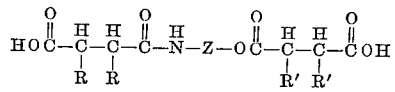

where Z is an alkylene group having 3–8 carbon atoms, and one each of R and R' is an alkenyl group having 8–18 carbon atoms, the other R and R' being hydrogen.

7. A leaded petroleum distillate fuel comprising therein of a major amount sufficient to inhibit fouling of a leaded petroleum distillate fuel and a minor amount of

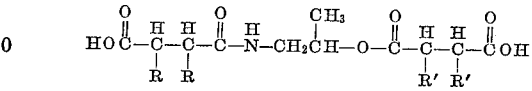

where one each of R and R' is alkenyl having 8–18 carbon atoms, the other R and R' being hydrogen.

8. A petroleum distillate fuel comprising therein of a major amount sufficient to inhibit corrosion of a petroleum distillate fuel and a minor amount of

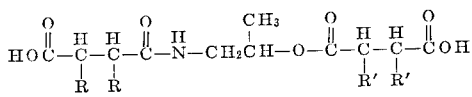

where one each of R and R' is alkenyl having 8–18 carbon atoms, the other R and R' being hydrogen.

9. A leaded petroleum distillate fuel comprising therein of a major amount sufficient to inhibit fouling of a leaded petroleum distillate fuel and a minor amount of

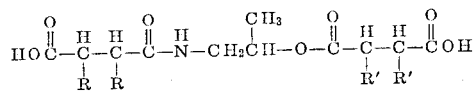

where one each of R and R' is dodecenyl, the other R and R' being hydrogen.

10. A petroleum distillate fuel comprising therein of a major amount sufficient to inhibit corrosion of a petroleum distillate fuel and a minor amount of

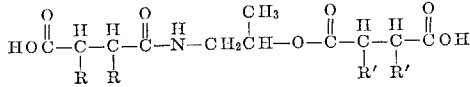

where one each of R and R' is dodecenyl, the other R and R' being hydrogen.

References Cited
UNITED STATES PATENTS

| | | | |
|---|---|---|---|
| 2,604,451 | 7/1952 | Rocchini | 252—392 |
| 2,638,449 | 5/1953 | White et al. | 252—392 |
| 2,797,152 | 6/1957 | Hughes | 44—69 |
| 2,944,969 | 7/1960 | Stromberg et al. | 252—8.55 |
| 3,095,286 | 6/1963 | Andress et al. | 44—71 |

DANIEL E. WYMAN, *Primary Examiner.*

Y. H. SMITH, *Assistant Examiner.*